Aug. 14, 1962  G. W. STANTON ET AL  3,049,507
METHOD OF MAKING GRAFT COPOLYMER OF VINYL LACTAM
MONOMER ON POLYOLEFIN SUBSTRATE, COMPOSITION
CONTAINING SAME, AND ARTICLE THEREOF
Filed Jan. 29, 1958
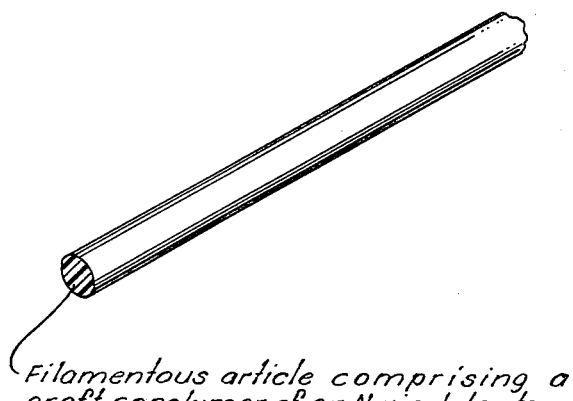
Filamentous article comprising a graft copolymer of an N-vinyl lactam monomer on a polyolefin polymer substrate.
INVENTORS.
George W. Stanton
Teddy G. Traylor
BY
Griswold & Burdick
ATTORNEYS 3,049,507
METHOD OF MAKING GRAFT COPOLYMER OF VINYL LACTAM MONOMER ON POLY-OLEFIN SUBSTRATE, COMPOSITION CONTAINING SAME, AND ARTICLE THEREOF
George W. Stanton, Walnut Creek, and Teddy G. Traylor, Concord, Calif., assignors to The Dow Chemical Company, Midland, Mich., a corporation of Delaware
Filed Jan. 29, 1958, Ser. No. 711,941
9 Claims. (Cl. 260—45.5)

The present invention lies generally in the field of organic chemistry and contributes in particular to the art which pertains to synthetic, fiber-forming high polymers. More particularly, the present invention has reference to the provision of certain readily-dyeable graft or block-type copolymers that are comprised of vinyl lactam monomers polymerized on non-aromatic, hydrocarbon polymer substrates which may hereinafter be more simply referred to as "polyolefin polymers" or merely as "polyolefins."

Hydrophobic polymeric materials of varying origin are commonly employed in the manufacture of various synthetic shaped articles including films, ribbons, fibers, filaments, yarns, threads and the like and related structures, which hereinafter will be illustrated with particular reference to fibers. Non-aromatic, hydrocarbon polyolefin polymers may be utilized with great advantage for such purposes.

The polyolefin materials that are contemplated as being adapted for utilization as substrates in the practice of the present invention include any of the non-aromatic, hydrocarbon olefin polymers, such as polyethylene, polypropylene and the like, that have been prepared from monomeric, non-aromatic hydrocarbon, monolefinic monomers containing from 2 to 6 carbon atoms in their molecule, such as ethylene, propylene, 4-methylpentene and the like. It is especially advantageous to utilize a polypropylene composition, particularly one of the fiber-forming variety, for this purpose. In this connection, it is generally desirable for the polyolefin that is employed to be one of the relatively more recent macromolecular, essentially linear and high density species of polymers that have become available and which are generally characterized by their essentially linear, unbranched molecular configurations, and which may be made under the influence of such catalyst systems as have been described in Belgian Patent No. 533,362 (which are frequently known as being Ziegler-type catalysts). If desired, however, polyethylene may be utilized which is of the conventional, generally branch structured variety that has ordinarily been polymerized under relatively high pressures and is oftentimes referred to and known as being a "polyethene."

Difficulty is often encountered in dyeing or coloring synthetic hydrophobic fibers and the like that have been prepared from non-aromatic, hydrocarbon olefin polymers. This is especially so when it is attempted to obtain relatively deeper shades of coloration in the finally dyed product.

Various techniques have been evolved for providing polyolefin compositions of improved dyeability. The practice of such techniques has not always been completely satisfactory. Neither have the products achieved thereby always provided a completely suitable solution to the problems involved. For example, many of the fiber products which are prepared in accordance with the above-identified techniques known to the art often have inferior physical properties when they are compared with those prepared from unmodified polyolefin polymers. Also, such products, once they have been prepared, may not be as receptive as might be desired to a wide range of dyestuffs, due to inherent limitations in the materials capable of being employed for enhancing dye-receptivity.

It would be advantageous, and it is the chief aim and concern of the present invention, to provide non-aromatic, hydrocarbon polyolefins which have been modified with certain graft or block copolymerized substituents so as to be exceptionally dye-receptive while being capable of being fabricated into fibers and the like and related shaped articles having excellent physical properties and other desirable characteristics commensurate with those obtained with the unmodified polyolefin polymer substrates, and of the general order obtainable with polypropylene, for example. This would possibilitate the manufacture of non-aromatic, hydrocarbon polyolefin based fibers and the like articles having the highly desirable combination of attractive physical characteristics and substantial capacity for and acceptance of dyestuffs.

To the attainment of these and related ends, a dye-receptive polymer composition that is adapted to provide shaped articles having excellent physical properties and characteristics while being simultaneously receptive of and dyeable to deep and level shades of coloration with many of a wide variety of dyestuffs is, according to the present invention, comprised of a fiber-forming graft or block copolymer which consists of a non-aromatic, hydrocarbon polyolefin substrate having a minor proportion of substituents graft copolymerized thereto which comprise or consist essentially of polymerized vinyl lactam monomers. Schematically, the compositions may be structurally represented in the following manner:

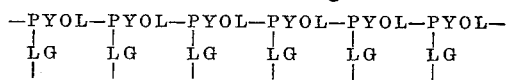

wherein the interlinked "PYOL" symbols represent the polyolefin polymer substrate or trunk and the symbols "LG" connected thereto the substituent graft copolymers branches of the indicated vinyl lactam monomer provided thereon.

As is apparent, the graft copolymer substituent that is combined with the polyolefin polymer substrate lends the desired receptivity of and substantivity for various dyestuffs to the compositions while the non-aromatic, hydrocarbon polyolefin polymer trunk substrate that is so modified facilities and secures the excellent physical properties and characteristics of the various shaped articles, including fibers into which the compositions may be fabricated. Advantageously, as mentioned, the polyolefin polymer substrate that is modified by graft copolymerization to provide the compositions of the invention is polypropylene, particularly that of the fiber-forming variety.

It is usually beneficial, as has been indicated, for the graft copolymer compositions of the present invention to contain a major proportion of the polyolefin polymer trunk or substrate that has been modified with the substituent dye-receptive graft copolymer groups chemically attached thereto. As a general rule, for example, it is desirable for the graft copolymer to be comprised of at least about 80 percent by weight of the polyolefin polymer substrate. In many instances, it may be satisfactory for the graft copolymer composition to be comprised of between about 85 and 95 percent by weight of the polyolefin polymer substrate, particularly when it is polypropylene. In this connection, however, better dyeability may generally be achieved when the grafted copolymeric substituents are prepared under such conditions that they have relatively long chain lengths. Thus, it is usually preferable, when identical quantities of grafted substituents are involved for relatively fewer, but longer chain length grafts to be available than to have a greater number of substituents of relatively shorter chain length.

The vinyl lactam monomers which are utilized to modify the polyolefin substrates so as to provide the graft copolymer compositions of the present invention may be any of those (or their mixtures) which are variously characterized and generically known to the art as N-vinyl or 1-vinyl lactams. Such monomers as have been described and are involved in U.S. Patents No. 2,265,450; 2,317,804; and 2,335,454 may be suitably employed in the practice of the invention. Advantageously, the N-vinyl lactam monomers that are employed are N-vinyl pyrrolidone or N-vinyl caprolactam, particularly the former. If desired, however, such other vinyl lactam monomers as N-vinyl-5-methyl pyrrolidone; N-vinyl-3,3-dimethyl pyrrolidone; N-vinyl piperidone; N-vinyl-3,3-dimethyl piperidone; N-vinyl hexahydrophthalimidine; N-vinyl-naphthostyrile; and the like may also be employed suitably.

As mentioned, the graft copolymer compositions of the invention have remarkably good dye-receptivity, particularly in view of their polyolefin polymer origin. In most cases, for example, the dye-receptivity of the graft copolymer compositions of the present invention is improved to such an extent in comparison with unmodified polyolefin polymers, particularly unmodified polypropylene, that a color differential of at least about 40 Judd units, as hereinafter illustrated, may readily be obtained between samples of the unmodified polyolefin polymer substrate and the graft copolymer compositions of the present invention, each of which have been dyed at a 4 percent dyeing, according to conventional techniques with such a dyestuff as Calcodur Pink 2BL. This is a significant advantage when the compositions are fabricated into shaped article form, especially when they are prepared in a filamentary form suitable for use as a textile material.

The Judd unit referred to in the foregoing is described and defined by D. B. Judd in an article in the "American Journal of Psychology," vol. 53, page 418 (1939). More applicable data appears in "Summary on Available Information on Small Color Difference Formulas," by Dorothy Nickerson in the American Dyestuff Reporter, vol. 33, page 252 (June 5, 1944). See also "Interrelation of Color Specifications," by Nickerson, in the "Paper Trade Journal," vol. 125, page 153, for November 6, 1947.

As is well known, Calcodur Pink 2BL is a direct type of dye that has a Color Index of 353. It is commercially obtainable under the indicated trade-designation. The same dyestuff, which is the sodium salt of 3,3'-disulphodiphenyl-urea-4,4'-diazobis-2-amino-8 - naphthol - 6 - sulfonic acid, is actually available (under several other commercial designations) from other sources. Calcodur Pink 2BL has the following structural formula, as is given on page 88, Section A, Part IV of the "Colour Index" (1st Ed., 1924) published by the (British) Society of Dyers and Colourists. Recently, this dyestuff has been designated Colour Index Direct Red 75.

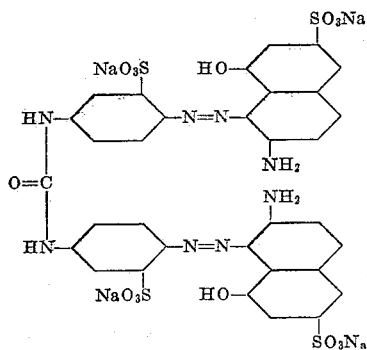

Besides having excellent physical properties and other desirable characteristics, fibers and the like articles comprised of the present compositions similarly have the indicated high capacity for being readily and satisfactorily dyed to deep and level shades of coloration with many dyestuffs. For example, fibers of the present compositions may be easily and successfully dyed according to conventional procedures using acid, vat, acetate, direct, naphthol, and sulfur dyes. Such dyestuffs, in addition to the particular variety mentioned, by way of didactic illustration, as Calcocid Alizarine Violet (Colour Index 61710, formerly Colour Index 1080), Amacel Scarlet BS (American Prototype Number 244 or Colour Index Dispersed Red 1 or 11110), Sulfanthrene Red 3B (Colour Index Vat Violet 2), Naphthol ASMX (Colour Index 35527), Fast Red TRN Salt (Colour Index Azoic Diazo 11), and Immedial Bordeaux G (Colour Index Sulfur Brown 12) may advantageously be employed for such purposes.

Other dyestuffs, by way of further illustration, that may be utilized beneficially on fiber products of the dye-receptive graft copolymer compositions of the invention include such direct cotton dyes as Chlorantine Fast Green 5BLL (Colour Index Direct Green 27), Chlorantine Fast Red 7B (Colour Index Direct Red 81), Pontamine Green GX Conc. 125 percent (Colour Index Direct Green 6), Calcomine Black EXN Conc. (Colour Index Direct Black 38), Niagara Blue NR (Colour Index Direct Blue 151) and Erie Fast Scarlet 4BA (Colour Index Direct Red 24); such acid dyes as Anthraquinone Green GN (Colour Index Acid Green 25), Sulfonine Brown 2B (Colour Index Acid Orange 51), Sulfonine Yellow 2G (Colour Index Acid Yellow 40), Xylene Milling Black 2B (Colour Index Acid Black 26A), Xylene Milling Blue FF (Colour Index Acid Blue 61), Xylene Fast Rubine 3GP PAT (Colour Index Acid Red 57), Calcocid Navy Blue R Conc. (Colour Index Acid Blue 120), Calcocid Fast Blue BL (Colour Index Fast Blue 59), Calcocid Milling Red 3R (Colour Index Acid Red 151), Alizarine Levelling Blue 2R (Colour Index Acid Blue 51), Amacid Azo and Yellow G Extra (both Colour Index Acid Yellow 63); such mordant-acid dyes as Alizarine Light Green GS (Colour Index Acid Green 25) and Brilliant Alizarine Sky Blue BS PAT (Colour Index Acid Blue 129); such vat dyestuffs as Midland Vat Blue R Powder (Colour Index Vat Blue 35), Sulfanthrene Brown G Paste (Colour Index Vat Brown 5), Sulfanthrene Blue 2B Dbl. Paste (Colour Index Vat Blue 5), and Sulfanthrene Red 3B Paste (Colour Index Vat Violet 2); Indigosol Green IB Powder (Colour Index Vat Green 1), a soluble vat dyestuff; such acetate dyes as Celliton Fast Brown 3RA Extra CF (Colour Index Dispersed Orange 5), Celliton Fast Rubine BA CF (Colour Index Dispersed Red 13), Artisil Direct Red 3BP and Celanthrene Red 3BR Conc. (both Colour Index Dispersed Red 15), Celanthrene Pure Blue BRS 400 percent (Colour Index Dispersed Blue 1), and Acetamine Yellow N (Colour Index Dispersed Yellow 32); B-Napthol←2-chloro-4-nitroaniline, an azoic dye; such sulfur dyes as Katigen Brilliant Blue GGS High Conc. (Colour Index Sulf. Blue 9) and Indo Carbon CLFS (Colour Index Sulf. Blue 6); and premetallized dyestuffs including Cibalan Yellow GRL (Cololur Index Acid Yellow 116; and the like.

The dyed products, especially textile fiber products, are generally lightfast and are well imbued with good resistance to crocking. In addition, dyed textile fiber products comprised of the compositions of the invention exhibit remarkable washfastness, despite repeated exposure and subjection to washing, laundering and dry cleaning treatments. A shaped filamentary article prepared from a dye-receptive composition in accordance with the present invention is schematically illustrated in the sole FIGURE of the hereto annexed drawing.

The dye-receptive graft copolymers of the present invention may be prepared and provided by swelling or impregnating the polyolefin polymer substrate with the monomeric substance then polymerizing the monomer in situ in the substrate. Advantageously, this may be accomplished when the substrate is in the form of an already shaped article, such as a fiber or filamentary structure. Beneficially, the graft copolymerization of the impregnated monomer may be accomplished and facilitated with the assistance of a polymerization catalyst or catalyzing influence which, preferentially, interacts with the substrate in order to establish or form grafting sites thereon and simultaneously or subsequently initiate the graft copolymerization. As a practical matter, it is generally most desirable to form the graft copolymer compositions in such manner. Most of the free radical generating chemical catalysts, including peroxide and persulfate catalysts, and actinic radiations, including ultraviolet light, may be utilized for the desired graft copolymerization. It may often be exceptionally advantageous, however, to accomplish the graft copolymerization by subjecting the monomer-impregnated polyolefin polymer substrate to a field of high energy radiation in order to efficiently provide an effectively attached graft copolymer of the polymerized monomeric impregnant on the hydrophobic polyolefin polymer substrate. Excellent results may also be achieved by activating the polyolefinic polymer substrate prior to contact with the monomer so as to generate or create free radical sites upon the substrate to which the monomer may attach in order to form the graft polymerized substituents. Such activation, as is known, may be accomplished by means of pre-irradiation in fields of high energy radiation (including ultraviolet light) or by exposing the polyolefinic polymer substrate to the influence of oxygen (in the presence of ultraviolet light) or to already formed ozone prior to contact with the graft copolymer-forming monomer.

The monomer may be intimately impregnated in the polyolefin polymer substrate in any desired manner prior to the graft copolymerization. Thus, the monomer may be directly applied, particularly when it has a swelling effect on the substrate, or it may be applied from dispersion or solution in suitable liquid vehicles, preferably those tending to swell the polymer, until a desired monomer content has been obtained. Ordinarily, it is advantageous for the monomer to be diluted in a solvent or dispersant vehicle so as to provide a treating bath in which to swell or impregnate the polyolefin polymer substrate with the latter being immersed in the bath for a sufficient period of time to attain a desired monomer content adequate for the intended purpose. The polyolefin polymer substrate, as has been mentioned, may be in any fabricated or unfabricated form. Unfabricated graft copolymer compositions in accordance with the present invention may be converted to shaped articles by any desired technique adapted for such purpose with conventional polymers. It is generally desirable and of significant advantage, however, to impregnate a preformed article, such as a textile fiber of the polyolefin polymer (or a cloth or fabric comprised thereof) with the monomer in order to prepare the graft copolymer compositions of the invention.

In this connection, particularly when preformed fiber structures are involved, the article may be in any desired state of formation for the impregnating and graft copolymerizing modification. Thus, fibers and films may be treated before or after any stretch has been imparted thereto. In addition, they may be in various stages of orientation, or in a gel, swollen or dried condition.

The impregnation and succeeding polymerization may, in general, be effected at temperatures between about 0° C. and about 200° C. for periods of time ranging up to 4 or more hours. The most suitable conditions in each instance may vary according to the nature and quantity of the specific monomeric impregnant involved and the graft copolymerizing technique that is utilized. For example, when chemical catalysts are employed for purposes of forming the graft copolymer, a temperature of between about 50° and 100° C. for a period of time between about 15 and 45 minutes may frequently be advantageously employed for the purpose. Under the influence of high energy radiation, however, it may frequently be of greatest advantage to accomplish the graft copolymerization at temperatures between about 20° and 60° C. utilizing relatively low dose rates and total dosages of the high energy for the desired purpose. Graft copolymerization on preactivated substrates may ordinarily be accomplished by simply exposing the activated substrate to the monomer (preferably in concentrated) solution, at an elevated temperature until the graft copolymerized substituents have formed on the substrate.

When the graft copolymer compositions are prepared from preformed or already shaped polyolefin polymer substrates that are successively impregnated with the monomer, which is then graft copolymerized in situ in the shaped article, excess monomer, if desired, may be squeezed out or removed in any suitable manner prior to effecting the graft copolymerization.

The chemical free radical generating catalysts which may be employed with the greatest advantage in the preparation of the graft copolymer compositions of the present invention include hydrogen peroxide, benzoyl peroxide, cumene hydroperoxide, ammonium or potassium persulfate and the like. Such catalysts may be used in conventional quantities to effect the graft copolymerization. When they are utilized, it is of greatest benefit to incorporate them in the impregnating solution of the monomer that is used.

The high energy radiation which may be employed for inducing the graft copolymerization for the preparation of the graft copolymers of the present invention is of the type which provides emitted particles or photons having an intrinsic energy of a magnitude which is greater than the planetary electron binding energies that occur in the graft copolymerizing materials. Such high energy radiation is available from various radioactive substances which provide beta or gamma radiation as, for example, radioactive elements including cobalt-60 and cesium-137, nuclear reaction fission products and the like. If it is preferred, however, high energy radiation from such sources as electron beam generators, including linear accelerators and resonant transformers, X-ray generators and the like may also be utilized. It is beneficial to employ the high energy radiation in a field of at least about 40,000 roentgens per hours intensity. A roentgen, as is commonly understood, is the amount of high energy radiation as may be provided in a radiation field which produces in one cubic centimeter of air at 0° C. and 760 millimeters of absolute mercury pressure, such a degree of conductivity that one electrostatic unit of charge is measured at saturation (when the secondary electrons are fully utilized and the wall effect of the chamber is avoided). It is most desirable, incidentally, to graft copolymerize all or substantially all of the monomeric impregnant to and with the acrylonitrile polymer substrate being modified in order to provide the compositions of the present invention. In addition, as has been indicated, particularly when preactivation of the substrate is performed, ultraviolet light may also be employed as the high energy radiation form including its use in combination with oxygen or ozone.

For purposes of specifically illustrating, without intending to thereby limit the invention, the following didactic examples are provided wherein, unless otherwise indicated, all parts and percentages are to be taken by weight.

*Example 1*

Fine fibers of polypropylene having an average size of about 3 denier were manufactured by melt spinning a propylene polymer having an apparent molecular weight of about 100 thousand (as indicated by its melt viscosity), and a melting point of about 170° C. The polypropylene fibers were swollen with N-vinyl pyrrolidone at a temperature of 70 to 90° C. The monomer was impregnated in the fiber by immersing the fiber sample in the liquid monomer. After the impregnation, excess monomer was removed by squeezing and the wet fiber, containing about 20 percent of the monomer impregnated therein, was then exposed at a distance of about 1 centimeter from a Machlett OEG–50 tube that was being operated at 50 thousand volts and 50 milliamperes. The exposure was continued for about 5 minutes. The irradiated yarn was then dried, scoured in a ½ percent aqueous solution of a non-ionic detergent which was a nonyl phenoxy polyoxyethylene ethanol ("Igepal CO, Extra") and dyed with Calcodur Pink 2BL.

The dyeing with Calcodur Pink 2BL was performed at the 4 percent level according to the usual procedure in which the fiber sample was maintained for about one hour at the boil in the dyebath which contained the dyestuff in about an amount equal to about 4 percent of the weight of the fiber. The dyebath also contained sodium sulfate in an amount equal to about 15 percent of the weight of the fiber and had a bath-to-fiber weight ratio of 30:1. After being dyed, the fiber was rinsed in water and dried for about 20 minutes at 80° C. The dye-receptivity of the Calcodur Pink 2BL-dyed fiber was evaluated spectrophotometrically by measuring the amount of monochromatic light having a wave length of about 520 millimicrons from a standard source that was reflected from the dyed sample. The numerical value obtained was taken along an arbitrarily designated scale from 0 to 100. This value represented the relative comparison of the light that was reflected from a standard white tile reflector that had a reflectance value of 316 by extrapolation from the 0 to 100 scale. Lower reflectance values are an indication of better dye-receptivity in the fiber. For example, a reflectance value of about 20 to 50 for polyolefin polymer fibers dyed with 4 percent Calcodur Pink 2BL is generally considered by those skilled in the art to represent a degree of dye-receptivity that readily meets or exceeds the most rigorous practical requirements and is ordinarily assured of receiving general commercial acceptance and approval. The 4 percent Calcodur Pink 2BL reflectance value of the graft copolymerized polypropylene fiber sample was about 15. Ordinary unmodified polypropylene fibers of the same type used for the preparation of the graft copolymerized product generally have a reflectance value of about 120 on the same numerical scale. Thus, the improvement in dye-receptivity between the graft copolymerized fiber product of the present invention in comparison with unmodified polypropylene polymers was such that a color differential of about 60 Judd units was obtained between the dyed graft copolymer composition and the unmodified polypropylene fiber.

The graft copolymerized fiber product was also dyed well to deep and level shades of coloration with Calcocid Alizarine Violet, an acid type of dyestuff (Color Index 1080); and Amacel Scarlet BS, an acid or acetate type of dyestuff (American Prototype No. 244).

*Example 2*

The procedure of Example 1 was repeated with the exception that the monomer-impregnated propylene fiber sample was rinsed with n-heptane immediately prior to radiation and was subjected to a total exposure in the X-ray beam for 20 minutes instead of 5. The results obtained were at least commensurate with those realized in the first example.

*Example 3*

The procedure of Example 1 was repeated with the exception that the irradiation exposure was 10 minutes instead of 5. The resulting fiber dyed to extremely deep and level shades of coloration, without evidence of ring-dyeing effects, when dyed with Calcodur Pink 2BL and the other mentioned dyestuffs in the manner set forth in the first example.

*Example 4*

The procedure of Example 3 was repeated, excepting to employ a mixture of 97 percent N-vinyl pyrrolidone and 3 percent water as the impregnating polypropylene-swelling monomer solution. The same results were obtained as in the third example.

*Example 5*

The procedure of Example 3 was repeated excepting to employ a mixture of 90 percent of the N-vinyl pyrrolidone and 10 percent of acetone for the impregnating polypropylene-swelling monomer solution. The results obtained were the same as those achieved in Example 3.

*Example 6*

The procedure of Example 4 was duplicated with the exception that the impregnation of the polypropylene with the aqueous N-vinyl pyrrolidone monomer was performed at a temperature of about 25° C. The dyeability of the resulting graft copolymerized product was still excellent despite the fact that it was slightly less than that of the product obtained in Example 4.

*Example 7*

A film of polypropylene similar to that employed in fiber form in the first example was placed about 3½ inches below an Hanovia ultraviolet lamp which was contained in a fritted glass funnel. The poly propylene film had an average thickness of about 15 mils. The film was exposed to the ultraviolet light for about one hour while a stream of oxygen was being continuously passed thereover so as to generate free radical graft sites on the polymer due to the oxidative influence of oxygen. The oxygen-treated film was then heated for about 12 hours in monomeric N-vinyl pyrrolidone at a temperature of 120° C. The graft copolymerized film product was then rinsed with water and dyed for one hour at the boil with Calcodur Pink 2BL in a manner analogous to that set forth in the first example. A very deep and uniform red shade of coloration was obtained in the graft copolymerized product. Its reflectance value was less than 10 and it showed a Judd unit improvement of at least 70 units over a plain polypropylene film.

*Example 8*

A polypropylene powder obtained from a polymer similar to that employed for the fibers in the first example was treated with ultraviolet light and oxygen as in Example 7. Another sample of the same polymer powder was subjected to an ozone treatment at 100° C. for a 2 minute period. A third sample was untreated. All three samples were placed in a mixture of 90 percent N-vinyl pyrrolidone and 3 percent water at 100° C. for an 18 hour period. They were then rinsed and dyed as in Example 7. The reflectance value of each of the dyed polymer samples was then determined in accordance with the manner set forth in the first example. The ozone-treated and graft copolymerized film sample had a Calcodur Pink 2BL reflectance value of 40. The ultraviolet light and oxygen treated sample had a reflectance value of 50. The untreated sample of film that had been immersed in the monomeric mixture and dyed had a reflectance value of 95. For purposes of comparison, the completely untreated and undyed powder had a reflectance value in excess of 100. An improvement of about 20–25 Judd units was obtained in the graft copolymer product.

*Example 9*

Several samples of polypropylene fibers similar to those employed in the first example were treated as in Example 8 with the exception that the sample exposed to the ozone treatment was subjected to the ozone for 1½ hours at 25° C. Each of the samples were then dyed with Calcodur Pink 2BL in the indicated manner. The ultraviolet and oxygen treated fiber sample has a Calcodur Pink 2BL reflectance value of about 80. The sample treated with ozone prior to the graft copolymerization and subsequently dyed had a reflectance value of about 11. The untreated fiber sample that was immersed in the monomeric mixture and subsequently dyed had a reflectance of about 80. In comparison, a completely untreated and undyed control sample of the same fiber had a reflectance value of greater than 100.

*Example 10*

A small sample of about 3 denier fiber prepared from crystalline poly-4-methylpentene was pre-irradiated by exposure at room temperature to a high energy-X-ray radiation beam from a Van de Graaff electrostatic generator operating under a potential of 2 million electron volts with a 250 microampere beam current impinging on a tungsten target. The fiber was subjected to the high energy at a dose rate of about 50 mrep. (million roentgen equivalent physicals) per minute until a total dosage of about 10 mrep. had been obtained. The pre-irradiated fiber was then immersed in N-vinyl pyrrolidone and heated for about 4 hours at 100° C. It was then removed from the monomer, washed thoroughly with water and dried. The fiber dyed to deep and level shades of coloration with 4 percent Calcodur Pink 2BL. The Calcodur Pink 2BL-dyed fiber had a reflectance value of 11. In comparison, a sample of the same fiber that was not treated was not at all stained when it was attempted to be dyed with the dyestuff and had a reflectance value of much more than 100. The product had about a 50 Judd unit improvement.

*Example 11*

Polypropylene fiber similar to that employed in the first example was treated with ozone for about 1½ hours at 25° C. The sample was then placed in a mixture of 25 percent N-vinyl pyrrolidone, 25 percent ethylene diacrylate and 50 percent N-methyl pyrrolidone wherein it was heated for 4 hours at a temperature of 100° C. Excellent dyeability with a wide variety of dyestuffs, including Calcodur Pink 2BL, Amacel Scarlet BS and Calcocid Alizarine Violet was obtained. The graft copolymerized polypropylene fiber product had a sticking temperature of about 154° C. and a melting point of about 200° C.

Results similar to the foregoing may also be obtained when any other of the mentioned varieties of vinyl lactam monomers, including N-vinyl caprolactam, are utilized in a similar manner in place of those set forth in the above examples and when graft copolymers are prepared with such monomers on other varieties of non-aromatic, hydrocarbon olefin polymer substrates.

What is claimed is:

1. Dye-receptive graft copolymer composition comprised of (1) a polyolefin of a 2 to 6 carbon atom non-aromatic, hydrocarbon monoolefin, said polymer substrate having chemically attached to carbon atoms in its chain, as graft copolymerized substituents thereon a minor proportion of up to about 20 percent by weight, based on the weight of the composition, of units of (2) a polymerized N-vinyl lactam monomer.

2. The composition of claim 1, wherein said polyolefin has between about 5 and 15 percent by weight, based on the weight of the composition, of said polymerized N-vinyl lactam units attached thereto.

3. The composition of claim 1, wherein said polyolefin is polypropylene.

4. The composition of claim 1, wherein said polymerized N-vinyl lactam units are comprised of polymerized N-vinyl pyrrolidone units.

5. The composition of claim 1, wherein said polymerized N-vinyl lactam units are comprised of polymerized N-vinyl caprolactam units.

6. The composition of claim 1, wherein said polyolefin is polypropylene and wherein said copolymerized N-vinyl lactam units are present in an amount up to about 20 percent by weight, based on the weight of the composition, and are comprised of polymerized N-vinyl pyrrolidone units.

7. A filamentary shaped article comprised of the composition set forth in claim 6.

8. A filamentary shaped article comprised of the composition set forth in claim 1.

9. Method for the preparation of a dye-receptive graft copolymer which comprises contacting a polymer of a 2 to 6 carbon atom, non-aromatic, hydrocarbon monoolefin with an N-vinyl lactam monomer; then polymerizing said monomer in contact with said polymer at a temperature between about 0° C. and about 200° C. until said monomer is graft copolymerized on said polymer.

No references cited.